US007788678B2

(12) United States Patent  
Straube et al.

(10) Patent No.: US 7,788,678 B2
(45) Date of Patent: *Aug. 31, 2010

(54) URGENT REPLICATION FACILITY

(75) Inventors: Dave D. Straube, Redmond, WA (US);
Aaron M. Contorer, Kirkland, WA (US); Arnold S. Miller, Bellevue, WA (US); Balan S. Raman, Redmond, WA (US); Pradyumna K. Misra, Issaquah, WA (US); Michael R. C. Seaman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 703 days.

This patent is subject to a terminal disclaimer.

(21) Appl. No.: 11/688,760

(22) Filed: Mar. 20, 2007

(65) Prior Publication Data

US 2007/0162519 A1 Jul. 12, 2007

Related U.S. Application Data

(63) Continuation of application No. 11/408,654, filed on Apr. 21, 2006, now Pat. No. 7,430,744, which is a continuation of application No. 10/154,014, filed on May 23, 2002, now Pat. No. 7,200,847, which is a continuation of application No. 08/673,929, filed on Jul. 1, 1996, now Pat. No. 6,412,017.

(51) Int. Cl.
*G06F 9/44* (2006.01)
*G06F 17/00* (2006.01)

(52) U.S. Cl. .................. 719/316; 719/313; 719/318; 707/695

(58) Field of Classification Search .............. 719/310, 719/313, 315, 316; 707/8, 10, 201, 203, 707/695, 705, 821; 709/206, 207
See application file for complete search history.

(56) References Cited

U.S. PATENT DOCUMENTS

| 4,432,057 | A | * | 2/1984 | Daniell et al. | 707/8 |
| 4,714,995 | A | * | 12/1987 | Materna et al. | 707/201 |
| 5,133,075 | A | * | 7/1992 | Risch | 707/201 |
| 5,170,480 | A | * | 12/1992 | Mohan et al. | 707/201 |
| 5,212,789 | A | * | 5/1993 | Rago | 707/8 |
| 5,403,639 | A | * | 4/1995 | Belsan et al. | 707/204 |
| 5,408,619 | A | * | 4/1995 | Oran | 707/10 |
| 5,423,037 | A | * | 6/1995 | Hvasshovd | 707/202 |

(Continued)

OTHER PUBLICATIONS

NOA dated Jan. 27, 2010, issued in U.S. Appl. No. 11/275,116.

*Primary Examiner*—Van H Nguyen
(74) *Attorney, Agent, or Firm*—Merchant & Gould PC

(57) ABSTRACT

A system and method for expediting the replication of at least one specified object to a replica in a distributed computer system. A source object of a source replica determines that it has an urgent change to propagate through the distributed system, and informs a replication facility at the source replica of the urgent change. The facility extracts, or is provided with, the change information from that object, and the source replica communicates information representative of the change to a destination replica. A replication facility at the destination replica provides the change information to a destination replica object, which uses the information to make itself consistent with the source replica object.

20 Claims, 8 Drawing Sheets

U.S. PATENT DOCUMENTS

| | | | |
|---|---|---|---|
| 5,434,994 A * | 7/1995 | Shaheen et al. | 709/223 |
| 5,551,034 A * | 8/1996 | Herz | 719/313 |
| 5,553,279 A * | 9/1996 | Goldring | 707/201 |
| 5,586,310 A * | 12/1996 | Sharman | 707/10 |
| 5,588,147 A * | 12/1996 | Neeman et al. | 707/1 |
| 5,590,318 A * | 12/1996 | Zbikowski et al. | 707/202 |
| 5,630,116 A * | 5/1997 | Takaya et al. | 707/201 |
| 5,740,433 A * | 4/1998 | Carr et al. | 707/202 |
| 5,765,171 A * | 6/1998 | Gehani et al. | 707/203 |
| 5,796,999 A * | 8/1998 | Azagury et al. | 707/10 |
| 5,832,514 A * | 11/1998 | Norin et al. | 707/202 |
| 5,845,116 A * | 12/1998 | Saito et al. | 718/103 |
| 6,049,809 A * | 4/2000 | Raman et al. | 707/203 |
| 6,192,365 B1 * | 2/2001 | Draper et al. | 707/101 |
| 6,412,017 B1 * | 6/2002 | Straube et al. | 719/313 |
| 7,200,847 B2 * | 4/2007 | Straube et al. | 719/313 |
| 7,430,744 B2 * | 9/2008 | Straube et al. | 719/313 |

* cited by examiner

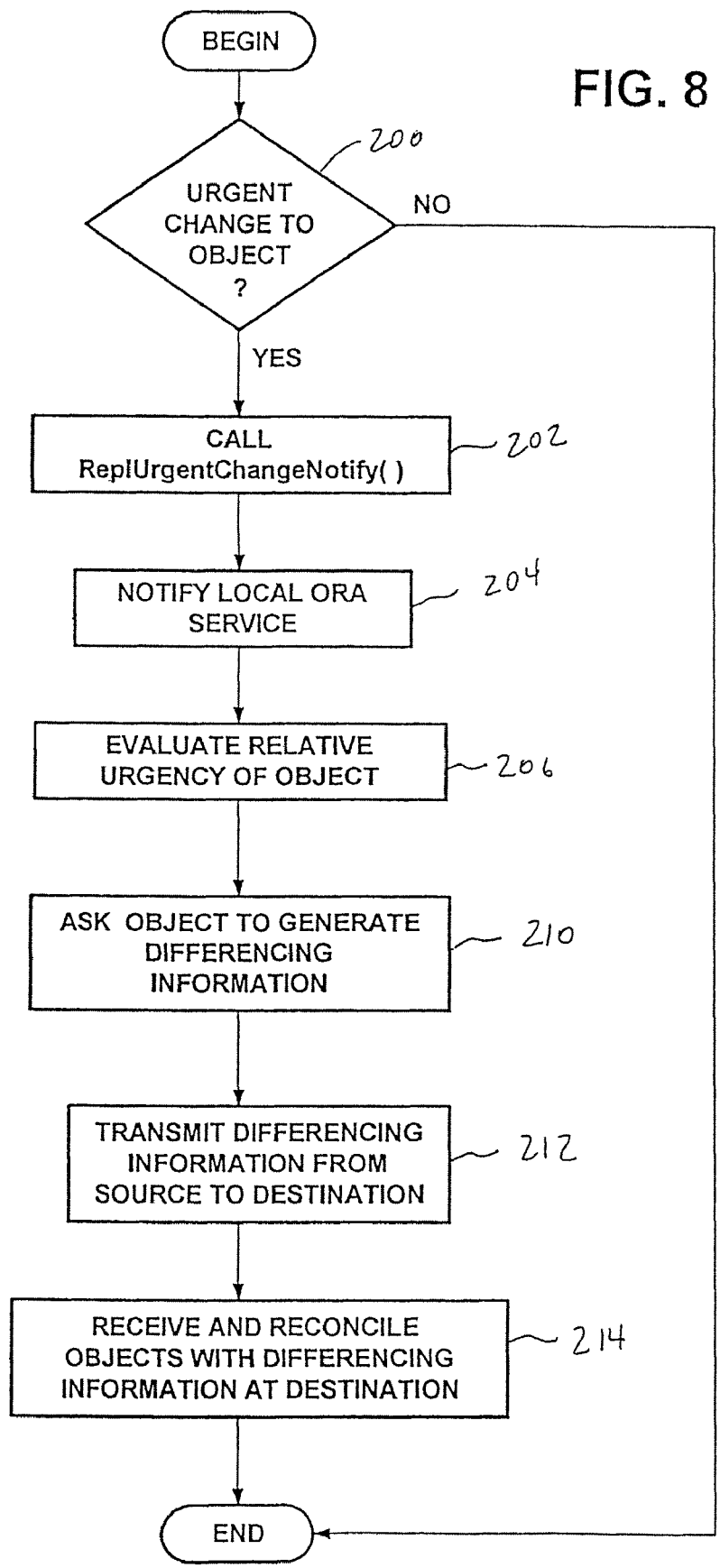

URGENT REPLICATION FACILITY

CROSS-REFERENCE TO RELATED APPLICATIONS

This application is a continuation of U.S. patent application Ser. No. 11/408,654 filed Apr. 21, 2006, now U.S. Pat. No. 7,430,744, which is a continuation of U.S. patent application Ser. No. 10/154,014 filed May 23, 2002, now U.S. Pat. No. 7,200,847, which is a continuation of U.S. patent application Ser. No. 08/673,929 filed Jul. 1, 1996, now U.S. Pat. No. 6,412,017. This application is also related to U.S. patent application Ser. No. 11/275,116 entitled "URGENT REPLICATION FACILITY," filed Dec. 12, 2005, currently pending. U.S. patent application Ser. No. 08/673,929; corresponding U.S. Pat. No. 6,412,017; and U.S. patent application Ser. No. 11/275,116 are all hereby incorporated by reference in their entirety as if set forth herein in full.

FIELD OF THE INVENTION

The present invention relates generally to facilities for replicating data in a distributed system, and more particularly to an improved facility for urgently replicating data in a distributed network environment.

BACKGROUND OF THE INVENTION

In a distributed network environment, multiple copies of replicated data, such as multiple copies of files, objects, directory structures, programs or databases, are typically distributed throughout the network. For example, in a wide area network (WAN) comprised of multiple local area networks (LANs), a separate copy of replicated data may reside in at least one file server or workstation located on each of the LANs.

A benefit to having replicated data in the above-described distributed network includes facilitating access to the replicated data by each of the nodes on the network. Nodes may simply obtain the desired data locally on their LAN rather than seeking the data from another node on the WAN in a perhaps more costly and time-consuming manner. In addition, replicated data helps to distribute the load on any given node that would otherwise have to maintain the data and respond to all requests for such data from all other nodes on the network. A further benefit includes enhancing system reliability, e.g., no one node (which may fail) exclusively possesses access to required data. Databases, network directory services and groupware are typical products that take advantage of replication.

Since the replicated data may change and multiple copies of the replicated data are distributed throughout the network, replication facilities must typically employ some scheme for reconciling any differences and ensuring a certain amount of consistency between the replica set. A replica set is considered to have strong consistency if the changes to the data are reconciled simultaneously throughout the set at some ordained time. Weak consistency is a concept which allows the replicas to be moderately, yet tolerably, inconsistent at various times.

As can be appreciated, maintaining strong consistency generally requires the use of more resources, e.g., at least in terms of reduced available bandwidth. Moreover, strong consistency becomes more and more impractical, and at some point almost impossible, to guarantee as the numbers of replicas increase in a distributed system. This is mostly due to performance limitations, network partitioning, and the like. Consequently, most replicated systems implement some level of weak consistency.

An improved replication facility which provides a standardized interface for replication that can be used regardless of the underlying file system is described in commonly assigned U.S. patent application Ser. No. 08/181,704, the entire description found therein being incorporated herein by reference. For ease of understanding, the general replication topology described therein can be thought of as a graph of unidirectional edges where changes are transmitted from a source to a destination. Replication occurs pairwise and in one direction. In other words, the destination is responsible for originating a request for replication from the source. This technique is known as pulling, since the destination attempts to pull the data from the source.

In this facility, a cursor is maintained at the destination for each connection (edge) it has to a source from which it pulls data. The cursors track the last change information received by the destination from the respective sources. Using a cursor, when a destination requests updates from a given source, the source provides the destination with 1) a list of objects (or other data structures) that have changed and 2) the type of change which has occurred for each object since the last replication to that destination. To avoid unnecessary transmission, the source also filters from this list any change items which it knows were originated or propagated by the requesting destination. The source then updates the cursor maintained at the destination based upon the replication information provided during that replication cycle.

After the list of changes is received at the destination, each object identified in the list attempts to reconcile itself with its counterpart object at the source using a class-specific reconciler. Class specific reconcilers allow each class of object to define for itself what it means to be consistent with other replica objects in its class. If a class specific reconciler is not available for a given data structure, e.g., a text file, then a default reconciler is used, which utilizes, for example, a "last writer wins" algorithm.

Because the above replication facility is "pull" driven by the destination, replication data is only sent to the destination at discrete intervals of time, usually set according to policies defined by the network system administrator and/or the system administrators of the source and destination. Moreover, to conserve network resources (such as available bandwidth), the discrete intervals of time are often set so as to provide only weak consistency.

As a result of the delay between time intervals, a relatively substantial amount of time may occur between replications. Although some delay is ordinarily acceptable with many types of replicated data, significant potential problems may arise with other types of data structures. In particular, changes to certain classes of objects such as password or access rights changes to user objects cannot be unduly delayed if system security is to be maintained.

As discussed above, the solution of decreasing the time interval between replications is not always practicable or even possible. Other solutions have been considered such as 1) tracking the differences between changed data structures to reduce the amount of data that needs to be transmitted during replication, i.e., data logging, or 2) expediting the replication of certain objects. However, such prior art solutions have required that the replicas possess both substantial knowledge of the complete replication topology and/or intimate knowledge of the operating environment of the other replicas. In other words, the replicas need to possess knowledge and/or assurance that all replicas are of similar implementation, e.g., that the replicas have been implemented on uniform homogeneous object sets thereby obviating the above difficulties. As such, these solutions are not amenable to a distributed system wherein the replicas may have different file systems and/or many object types. Similarly, objects created by third parties cannot be easily replicated unless those objects are created with specific knowledge of the topology and file systems in which they may be replicated.

OBJECTS AND SUMMARY OF THE INVENTION

Accordingly, a primary objective of the present invention is to provide a system and method of efficiently replicating data objects in a distributed system of replicas.

In accomplishing that objective, it is an aim of the invention to provide a replication facility that maintains incremental differencing information and replicates the differencing information upon a request for replication.

It is also an objective of the invention to provide a replication facility that enables the expedited replication of certain data objects deemed urgent.

It is a related objective to provide a replication facility wherein an object may initiate its propagation to other replicas in the system.

Another objective of the invention is to provide a system and method for replicating objects in an object-oriented environment.

Still another objective of the invention is to provide a system and method for replicating objects wherein any object can be replicated throughout one or more replicas in the system without the need for the object to have knowledge of the replication topology or the operating environment.

It is a related objective to provide a replication facility that is extensible and replicates objects independent of the type of file systems used to store those objects.

Briefly, the present invention provides a system and method for expediting the replication of at least one specified object to a replica in a distributed computer system. A source object informs a source replica that it has changed, and the source extracts change information from the object. The source replica transmits information representative of the change to a destination replica, and the information is received at destination replica. The destination replica extracts the change information from the received information, and provides the change information to a replica object of the destination.

Other objects and advantages will become apparent from the following detailed description when taken in conjunction with attached drawings, in which:

BRIEF DESCRIPTION OF THE DRAWINGS

FIG. 8 is a flow diagram illustrating the steps taken when replicating an urgent object.

Figure 1:
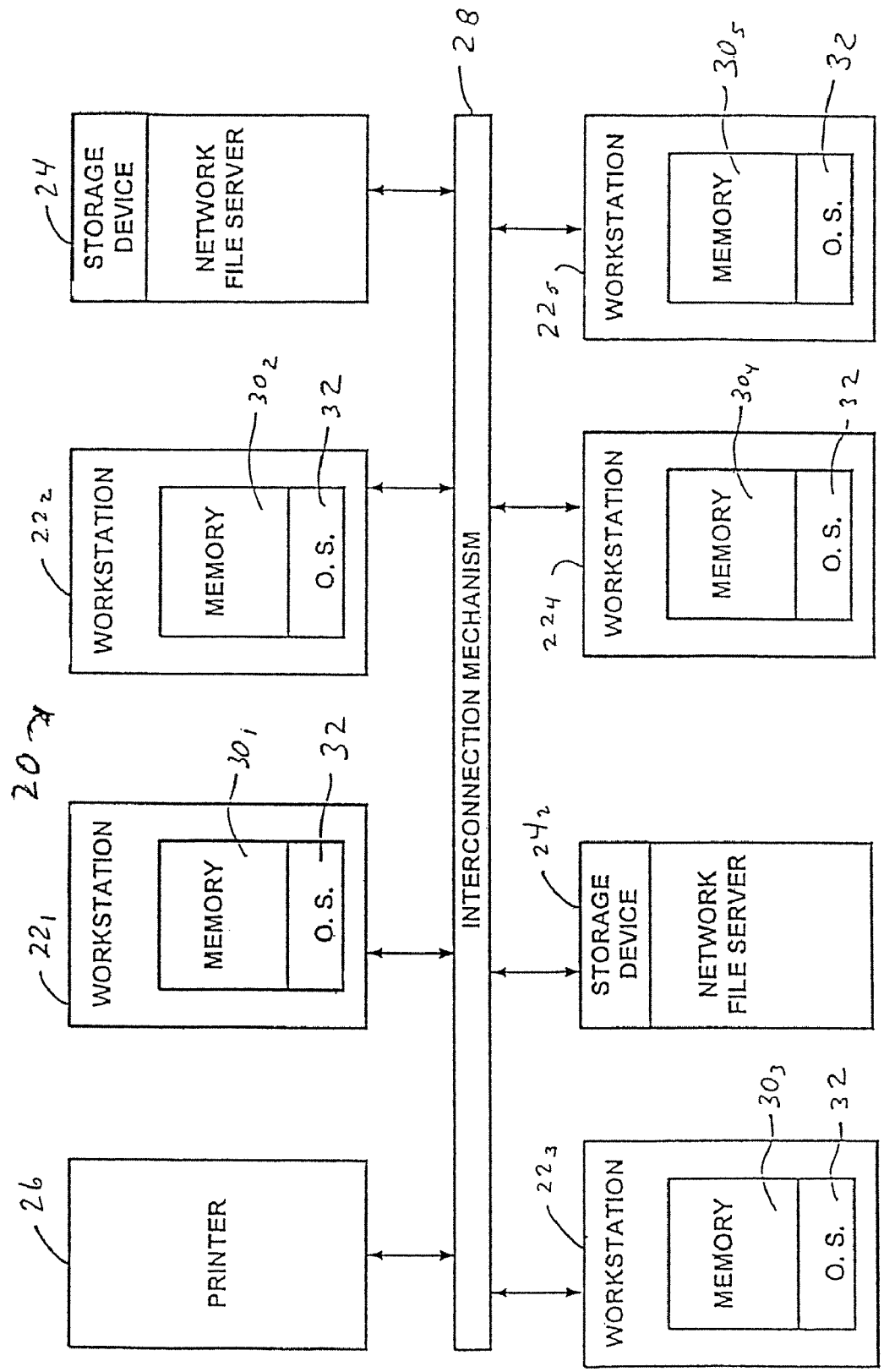
FIG. 1 is a block diagram showing a representative distributed system in which the invention may be implemented and having a number of computer resources connected in a networked fashion.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning to the drawings and referring first to FIG. 1, there is shown a block diagram of a distributed system, generally designated 20, in which the replication facility of the present invention may be implemented. The distributed system 20 illustrated herein comprises a number of computer-based resources $22_1$-$22_5$, $24_1$-$24_2$ and 26 interconnected in a networked fashion on an interconnection mechanism 28, which may be a local area network, wide area network or other distributed interconnection mechanism. The distributed system shown in FIG. 1 is intended to be exemplary of the type of distributed systems which are suitable for implementing the present invention.

Although not explicitly shown in FIG. 1, the present invention may be implemented in a multiple bus network topology, for example where a network server links multiple networks together, including configurations wherein the networks are running separate network operating systems. In addition, the present invention may be implemented on various types of networking topologies including bus, ring or star topologies.

Physically, the interconnection mechanism 28 may include any well-known data transmission medium, such as coaxial cable, fiber optic cable, or the like, in accordance with a chosen standard for hardware interfaces within each of the devices. Such standards, including ARCnet®, Ethernet® and Token Ring®, and their associated hardware interfaces, are well known in the art, and thus are not described in detail herein. Suffice it to say that a wide variety of interface hardware and software are commercially available to connect computer-based resources in a distributed system.

The distributed system 20 includes client workstations $22_1$-$22_5$ which may be personal computers or the like, each including a memory $30_1$-$30_5$ having a distributed operating system 32 loaded therein. In the described embodiment, each workstation $22_1$-$22_5$ acts as a replica by maintaining a copy of the replicated data in its own file system. There is no requirement that the file systems of the various workstations be the same. Other devices, such as other workstations (not shown), network servers $24_1$-$24_2$, a printer 26 and routers (not shown) are also present in the system 20.

The replication facility of the present invention is capable of replicating data independent of the specific file systems employed. Indeed, the replicas may be maintained in a memory independent of any file system. For example, a replica set may be maintained in the non-volatile random access memory (NVRAM) of a personal data assistant (PDA) or the like. However, for simplicity herein the replicas are generally referred to as being maintained in a file system.

Figure 2:
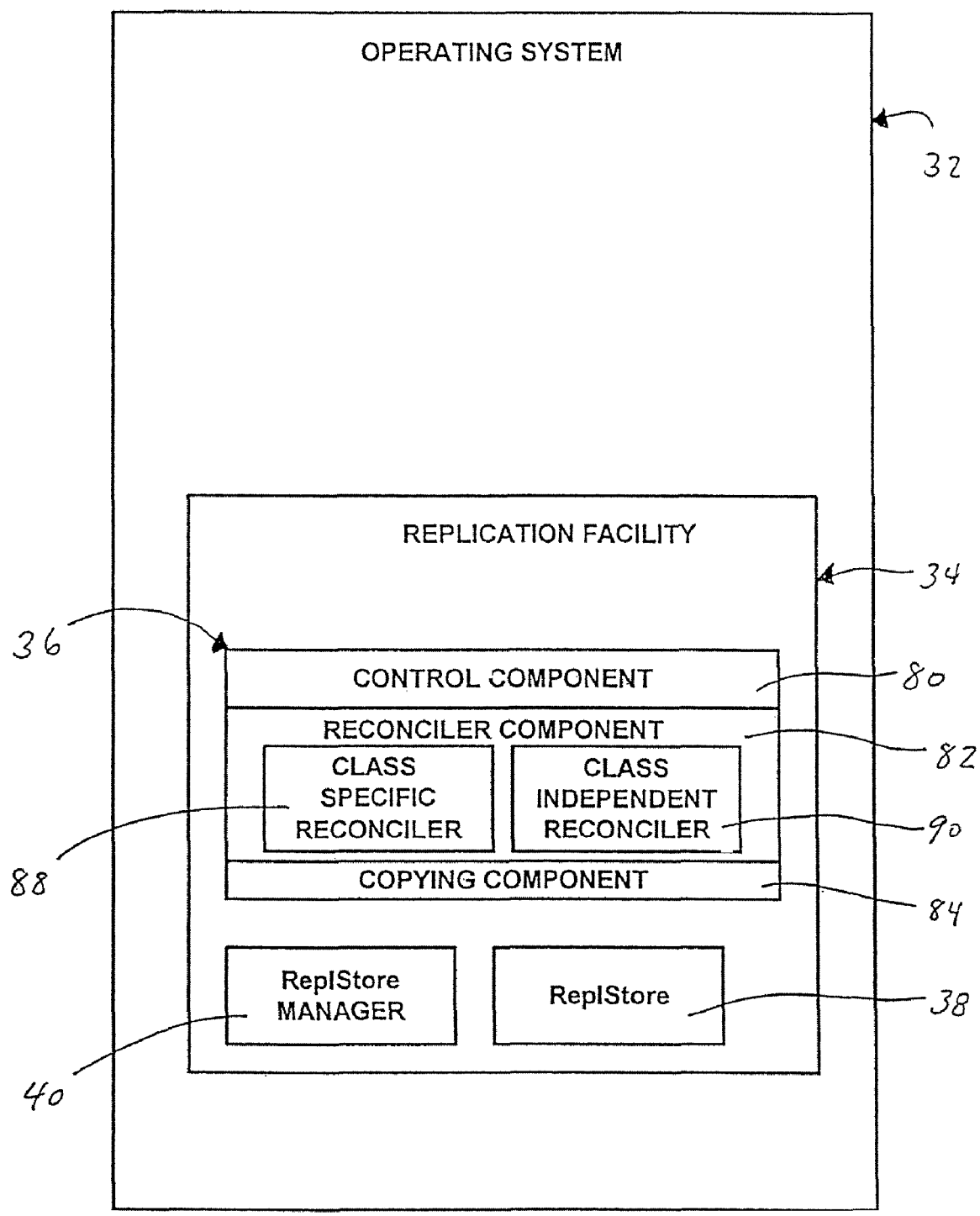
FIG. 2 is a block diagram illustrating the details of the replication facility contained within the distributed operating system shown in FIG. 1.

In keeping with one aspect of the invention, as best shown in FIG. 2 the distributed operating system 32 of the workstations includes a replication facility 34 for replicating data structures throughout the system 20. Although virtually any type of data structure including files and file directories may be replicated by the replication facility 34, replicated data structures will hereinafter ordinarily be referred to as objects, both for purposes of simplicity and because the replication facility 34 is particularly suitable for object-oriented environments. As described in more detail below, the preferred replication facility 34 includes a reconciler 36 which applies the differencing information to change the namespace and/or content of a local object (on a given one of the workstations) to reflect changes made to a remote object (on another of the workstations). Such replication and reconciliation are performed on a pair-wise basis and in one direction, and enables multiple copies of objects to be replicated and reconciled across the distributed system 20. As used herein, the term "replication" should be considered as referring to both the replication and reconciliation of objects, where appropriate.

Figure 3:
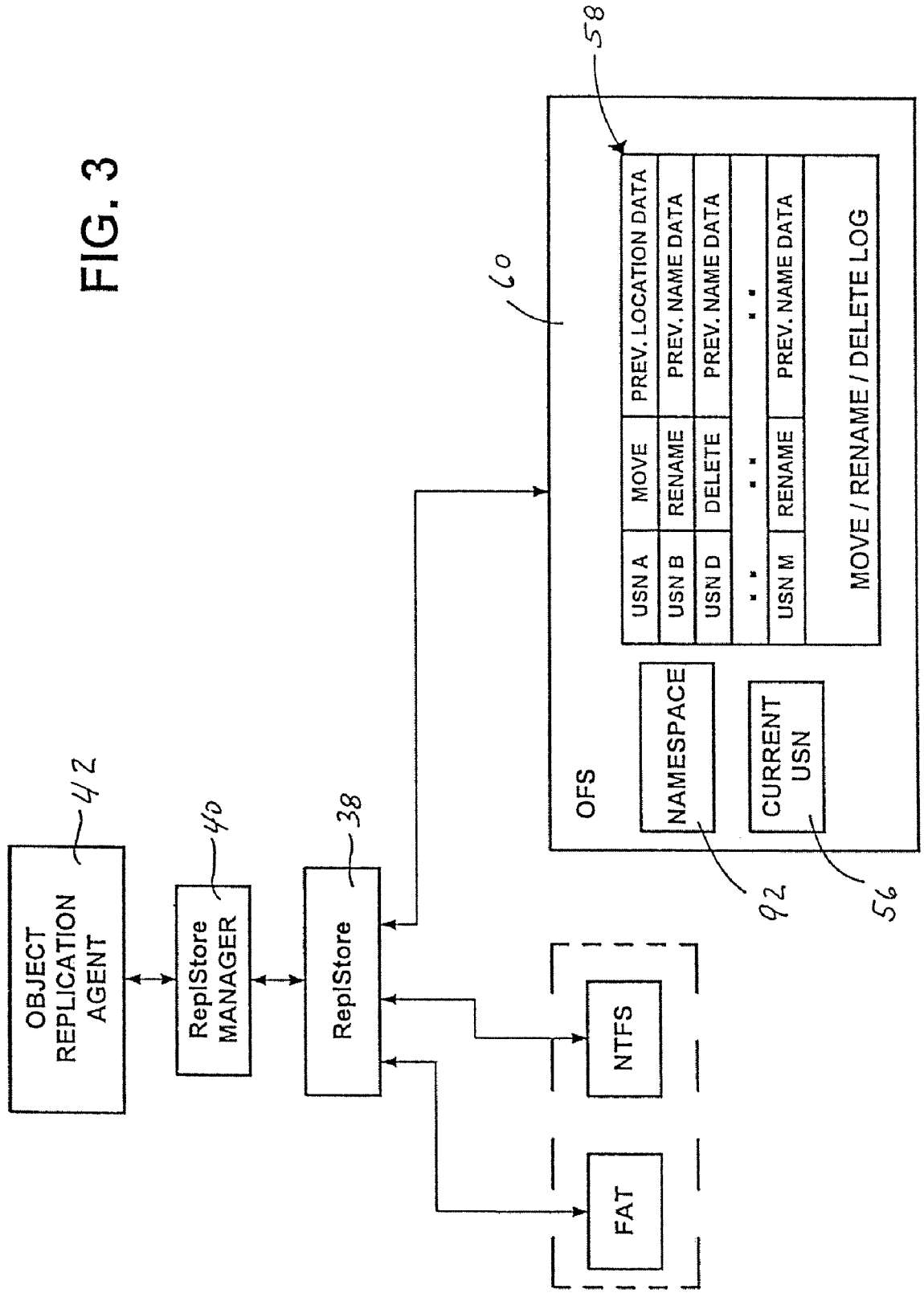
FIG. 3 is a block diagram representing the general architecture and functional components of the replication facility suitable for use with the present invention.

As shown in FIG. 3, in order to replicate objects among the replicas, which may exist on potentially different file systems, the distributed operating system 32 provides a replication engine comprising a standardized group of interfaces, known as ReplStore 38 (replicated object store). Clients call a ReplStore manager 40 which loads the appropriate ReplStore interfaces 38 according to the underlying file system. The ReplStore manager 40 also regulates access to the ReplStore interfaces 38. Both the ReplStore manager 40 and the ReplStore interfaces 38 are preferably provided in one or more Dynamic Link Libraries (DLLs), but may be provided in other ways, such as via drivers.

Using the ReplStore interfaces 38 thus provides the replication facility with access to the objects to be replicated regardless of the underlying file system. The ReplStore interfaces 38 specify signatures (such as parameters) so that the code for implementing the appropriate replication function or functions may be executed. The code that implements the function is ordinarily provided by objects or alternatively by other known implementations. In an object oriented system, the objects that provide the code comply with the signature specified in the interface, and are referred to as objects which "support" the interface. For example, an object store which stores objects in an object set may be configured to support the ReplStore interfaces 38 so that the objects of that object set may be replicated throughout the system.

Figure 4:
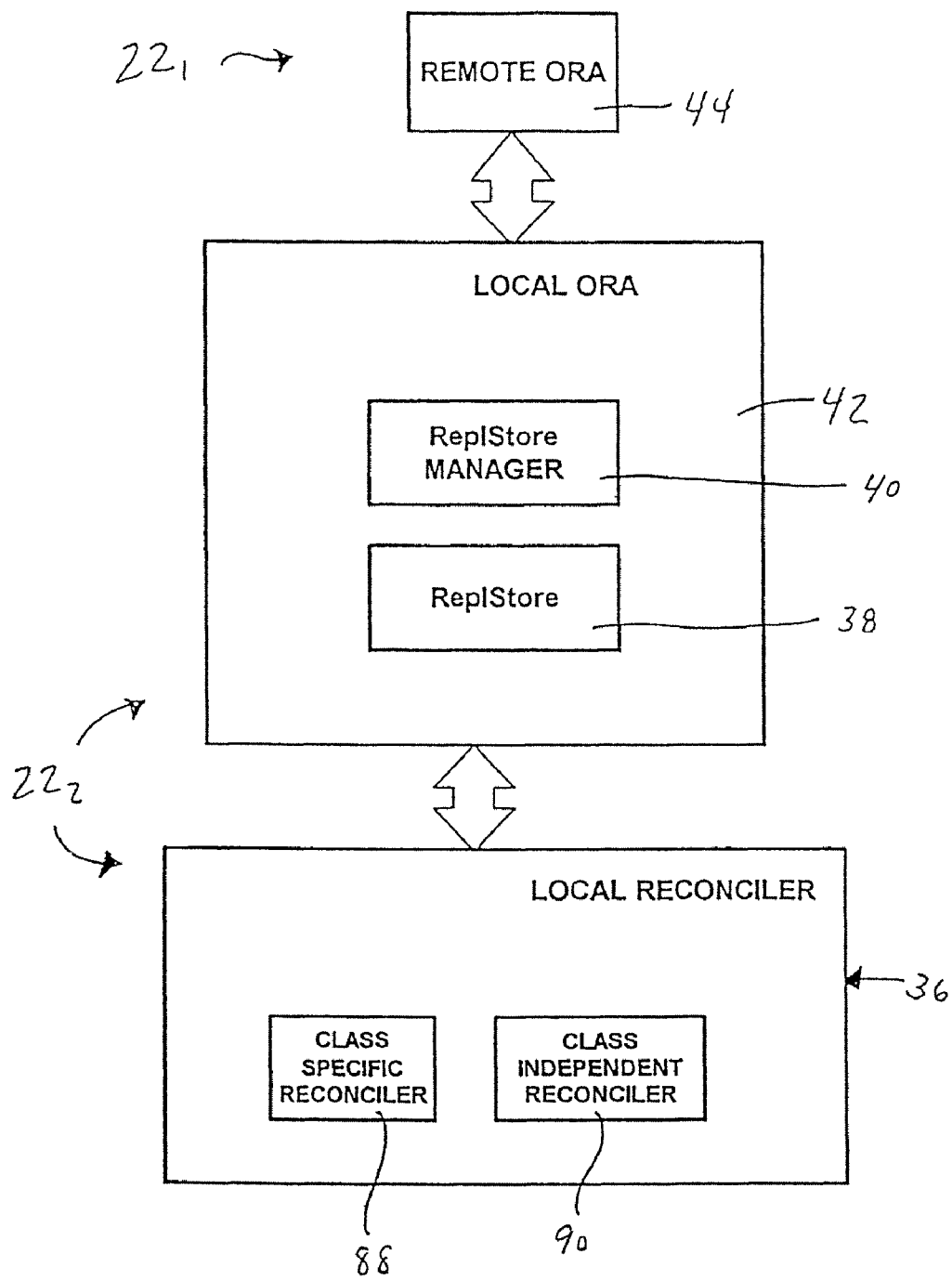
FIG. 4 is a block diagram representing how replication information is exchanged between a remote source and a local destination.

As shown in FIG. 4, each workstation 22 in the distributed system having a replica includes a local object replicator agent (ORA) 42, which can interface with one or more remote ORAs 44 on the other workstations. The local ORA 42 is a replicator service that provides automatic support for replication. The local ORA 42 loads its ReplStore manager Dynamic Link Library (DLL) 40, which in turn loads the ReplStore interface 38 as previously described. Considered from the perspective of a local workstation such as the workstation $22_2$, the local ORA 42 is responsible for communicating with a remote ORA 44 to facilitate the replication of changed objects. The local ORA 42 may be configured as remote procedural call (RPC) to service the replication requests of remote clients. Alternatively, other appropriate synchronous or asynchronous transport mechanisms may be utilized for replication, such as electronic mail, file transfer or direct network connections.

To reconcile the local object set with a remote object set, the local ORA 42 contacts the remote ORA 44 and provides information via a cursor 50 (FIG. 5) to the remote ORA 44 indicating the point (e.g., in time or any other monotonically increasing indicator of file system activity) from which replication is desired. The remote ORA returns changed object information to the local ORA 42 along with an updated cursor having information therein indicative of what point the source is at (e.g., an updated time stamp) with respect to the returned replication information. This updated replication point is stored at the destination $22_2$ in the cursor 50 for that source $22_1$, for use during the next replication cycle. Once the change information is present locally, the local ORA 42 invokes both the default and class specific reconcilers 88 and 90 to update its objects so as to be consistent with those of the remote replica which have changed since the point (e.g., time) identified in the cursor 50.

According to one aspect of the invention, because it is generally inefficient to transfer the entire object each time replication is desired, if an object is properly configured, the replication facility 34 of the present invention ordinarily attempts to communicate only the differencing information, i.e., changes made to an object rather than the changed object itself, whenever possible. This concept is referred to as incremental replication. Of course, the facility 34 may be arranged to transfer the entire object when it determines that the size of the object makes it more efficient to do so than to transfer and apply the differencing information.

In the situation where the object file system (OFS) is employed at a given workstation, to communicate the differencing information, the replication facility 34 according to the present invention utilizes information maintained in the OFS to optimize replication. By way of background, when OFS diskspace is initially formatted, an update sequence number (USN) is set to some floor value, (e.g., zero) in the OFS for that diskspace. After every create, modify, rename, delete or move operation, the USN is monotonically adjusted, i.e., increased for that disk volume. The OFS also maintains a move/rename/delete log that tracks changes to the name of an object. Unlike time (which can be modified and reset), USNs are only advanced. Therefore, it is preferable to utilize the USN for the cursor rather than a time stamp whenever the source node employs the OFS.

Figure 5:
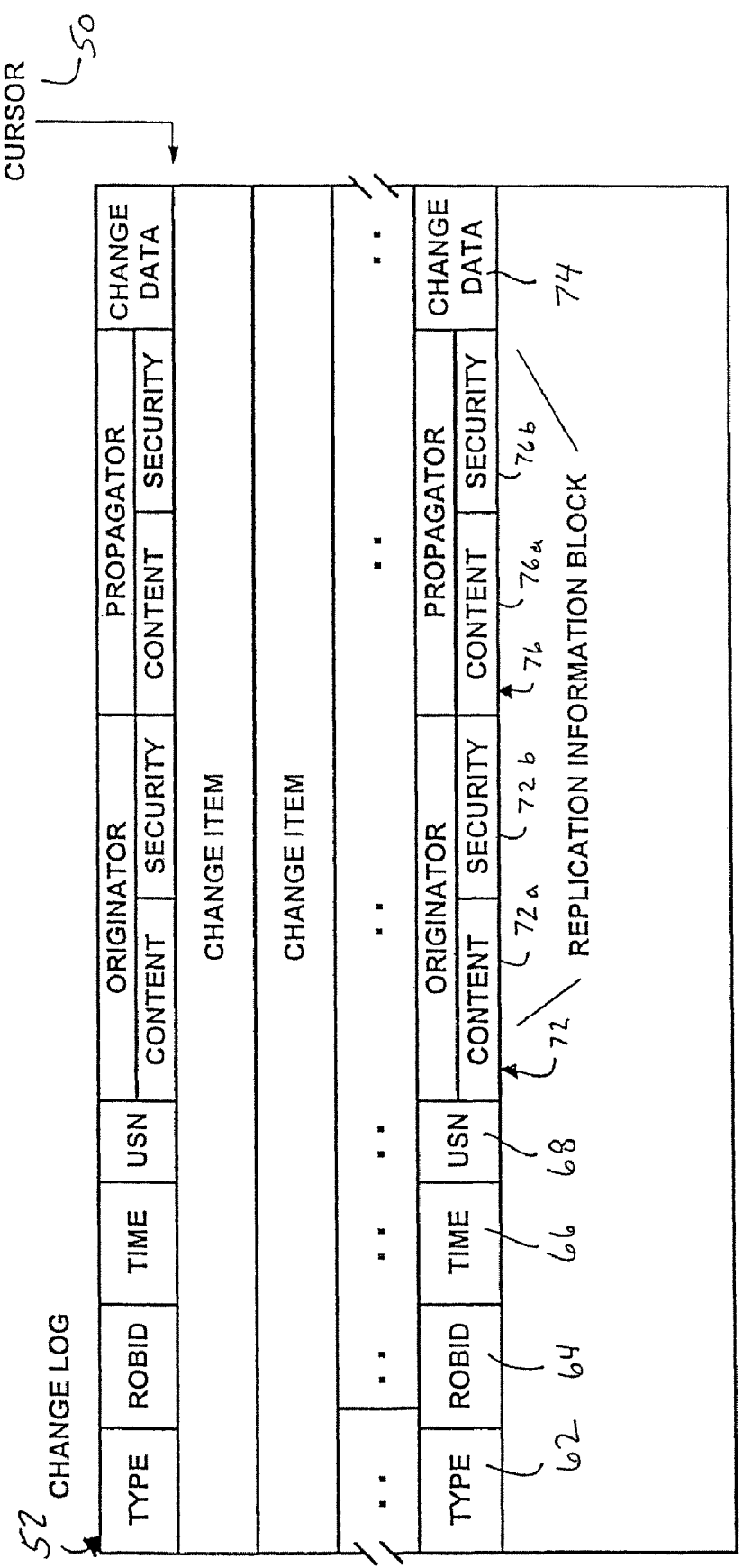
FIG. 5 is a block diagram representing an area of memory within a workstation of FIG. 1 wherein information is logged corresponding to changes made to objects.
Figure 6:
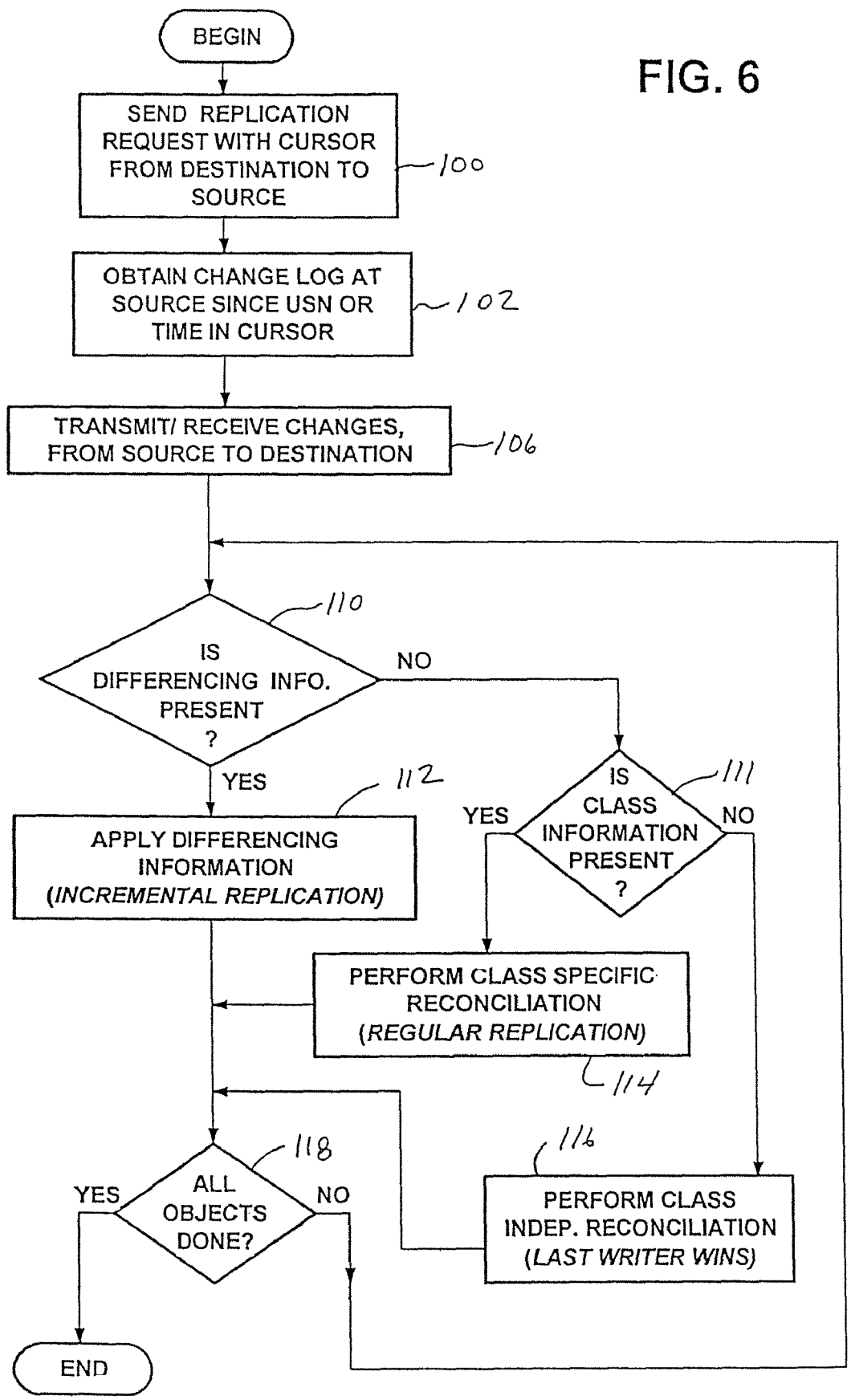
FIG. 6 is a flow diagram illustrating the steps taken when replicating and reconciling an object.

In operation, as shown at step 100 of the flow diagram of FIG. 6, when a destination (e.g., workstation $22_2$) requests replication via its ORA to a connected source (e.g., workstation $22_1$), it sends the source a cursor 50 (FIG. 5). The cursor 50 identifies from what point it last received replication information from that source, that is, the cursor 50 includes the USN and/or a time stamp (or whatever monotonic pointer the ReplStore uses to track file system activity) that was previously provided to it by the source $22_1$ during the last replication. Thus, the destination $22_2$ is essentially asking the source for all changes to objects it has had since the last cursor. The cursor 50 is relative to the source $22_1$, so that even if a time stamp rather than a USN or the like is used, any time difference between the source $22_1$, and the destination $22_2$ is immaterial.

At step 102 the source $22_1$, obtains a list of changes (including differencing information) in change log 52 and returns the list to the destination $22_2$ when feasible. The individual change items $54_1$-$54_n$ in the list 52 can either be logged as they are made to objects at the source, or dynamically rebuilt from stored information. For example, if the OFS is employed, the change log 52 can be dynamically rebuilt from the USN entries 56 and the move/rename/delete log 58 in the OFS diskspace 60 (FIG. 3). Regardless of how the list 52 is obtained, as shown in FIG. 5 each changed item $54_1$-$54_n$ returned to the destination includes a type field 62 indicative of whether an object has undergone a create, modify, rename, delete or move operation, along with a serialized replication object identifier (ROBID) in field 64 that identifies which object has changed. A time stamp and the USN (if OFS) or equivalent pointer(s) corresponding to that change are provided in fields 66 and 68, respectively. Also included is a replication information block (RIB) 70.

The RIB 70 is used for propagation dampening, i.e., to determine if a change needs to be propagated to a particular node so that changes are only propagated once to each replica node in the system. To this end, the RIB 70 comprises 1) an originator field 72 that indicates which node in the distributed system of replicas originated the change, and 2) a propagator field 76 indicative of which replica in the distributed system propagated the change to the source $22_1$. The originator field 72 will be the same as the propagator field 76 when the resource in which a change was originated was the one that propagated it to the source $22_1$. To minimize network traffic, the source $22_1$ reviews the change log and filters out change items 54 that were originated or propagated by the requesting destination $22_2$ before transmission to the destination $22_2$. However, because the content and the access rights on an object (security) can be separately changed and propagated, the RIB includes both content and security components, and treats each type of change separately with regard to propagation dampening. Thus, for example, if a security change is made at replica A for a given object while a content change is made at replica B for that same object, the respective changes will be propagated to the other replica and not filtered out, regardless of which direction was propagated first.

The change log 52 also includes a change data field 74 for transferring the difference information of MODIFY change types should the object class support differencing. If the object supports differencing, the source side ORA service fills in this data field with differencing information provided by the object. Significantly, the objects themselves can be appropriately configured to define the content of the change data field 74 independent of any prior agreements with the replication facility 34. Thus, objects created by third parties can essentially log and later apply the differencing information according to their own definitions.

When the change log 52 is received from the source $22_1$ (step 106), the ORA of the destination $22_2$ invokes the appropriate reconcilers 88 or 90 to make its objects consistent with those at the source $22_1$. If the object is configured to apply differencing information, the class specific reconciler 88 applies the differencing information in data field 74 to each object identified in ROBID field 64 according to information contained in the object itself. This may or may not include information such as class information, but in any event enables the object itself to determine what it means to be consistent with its counterpart objects at other replicas. In essence, an object created by a third party capable of functioning with differencing information thus determines its own level of consistency with its counterpart replicas.

As shown in FIG. 2, the reconciler 36 contains a control component 80, a reconciler component 82, and a copying component 84 for duplicating objects. The control component 80 determines when reconciliation occurs, for example, upon a request to reconcile or after a certain amount of time. The control component 80 also provides security and determines who can request reconciliation.

The replication facility 34 of the present invention is capable of performing regular replication with objects that are not configured to perform incremental replication as described herein. For example, if an object at a remote source does not provide its changes, but instead is arranged to perform class-specific reconciliation, the replication facility 34 handles the class-specific reconciliation on its objects, as described in U.S. patent application Ser. No. 08/181,704. Thus, at steps 110-111 the control component 80 also determines the type of reconciliation for each object based upon what information was received from the destination.

The reconciler component 82 provides the functions that perform the various types of reconciliation as determined by the control component 80. Thus, the reconciler component 82 includes a class specific reconciler 88 capable of performing on-line class specific reconciliation (step 114) if the object provides a class. Optionally, if supported by an object's class code, a class specific reconciler may be provided that is capable of generating and consuming differences. Thus, in the preferred embodiment, at least one class specific reconciler will apply received differencing information to the objects according to instructions in the object (step 112), when differencing information is received from the source $22_1$. Finally, a class independent reconciler 90 is also available when no class is specified, and functions according to a "last writer wins" rule to ensure identical content of objects (step 116).

When all objects in the log 52 have been reconciled as determined at step 118, the replication and reconciliation for that destination and source are completed.

By way of example of how an object is reconciled when the object has been configured to operate with differencing information, when a replicated object's content is changed at the source, a MODIFY operation is included in the cursor 50 as a change item. The type field 62 for the renamed object contains a value indicating that the object identified in ROBID field 64 was modified at the time stamp and USN (both relative to the source) that are present in fields 66 and 68, respectively. The originator content field 72a and propagator content field 76a in this instance both contain the identity of the source, since in the present example the object was renamed at that source. After the source side ORA service has received the MODIFY change from its corresponding ReplStore, the ORA service asks the object to generate differencing information (if the object supports differencing), which it then stores in the change data field 74.

When the differencing information is received, the destination $22_2$ requests reconciliation via the control component 80, which recognizes the differencing information. The control component 80 invokes the class specific reconciler component 88 to apply the changes. The class specific reconciler, which supports differencing, evaluates the object for instructions on how to reconcile it with the provided differencing information. In this example, the class specific reconciler 88 would typically modify the content of the destination object so that the objects are consistent.

As can be appreciated, extraction, transmission and application of the differencing information are distinct steps which the replication service can individually optimize. For example, extraction (at the source) and application (at the destination) can be scheduled so as to not conflict with other activities or heavy system usage. Transmission can include compressing and/or encrypting the differencing information if desired, regardless of whether the objects themselves support compression or encryption. As previously described, transmission can utilize any suitable transport mechanism, either synchronous or asynchronous.

An advantage to the replication facility described herein is that the objects define the content of their own differencing information, and are not required to have knowledge of the replication service. Enabling objects to call such replication services provides for significant extensibility. Further, in the Object Linking and Embedding (OLE) model of the present invention, it can be dynamically determined whether an object supports the differencing interface. Consequently, as new classes of objects are added to existing systems, the replication service can immediately determine how replication can be optimized for that object.

Turning to another aspect of the invention, there is provided a mechanism within the above-described replication facility 34 that enables a changed object to propagate itself to its replicas without waiting for a destination to initiate a replication cycle. This type of replication will be referred to hereinafter as "urgent replication." Urgent replication preferably functions on a push model, in which the source pushes a changed object to one or more destinations, although it is feasible to construct a pull model wherein a destination regularly polls a source seeking urgent changes. Alternatively, other types of replication of. urgent objects may be accomplished. For example, the source may notify a destination that it has urgent changes available, whereby the destination will pull those changes when ready, after some time interval. The time interval may be zero.

Figure 7:
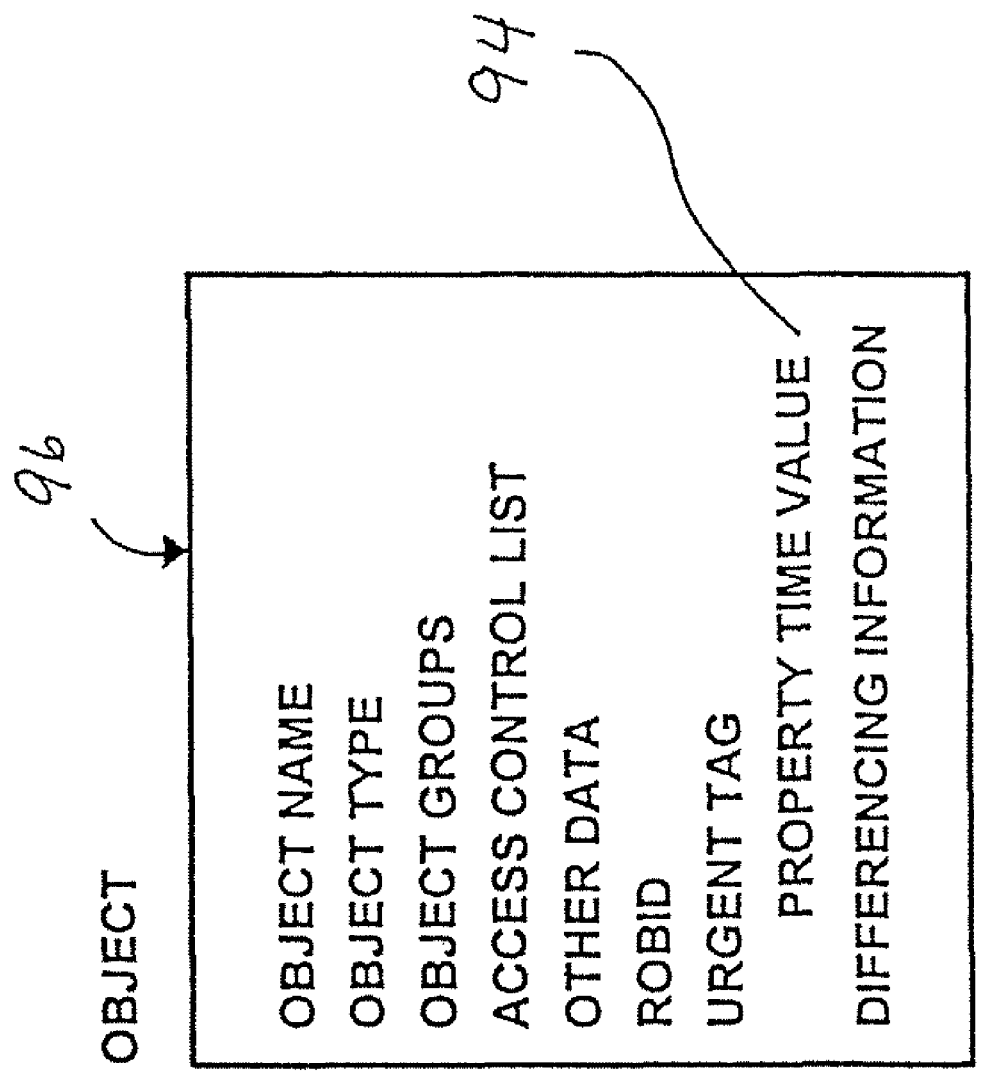
FIG. 7 is a representation of an object which is deemed to be an urgent object.

To accomplish urgent replication, certain objects are configured to recognize changes to themselves that are defined to be urgent, as shown in step 200 of FIG. 8. By way of example, whenever the access rights or password of a user object is changed, the object can be arranged to report the change to the replication facility 34 using a function named ReplUrgentChangeNotify( ), shown in FIG. 8 as step 202. Calling ReplUrgentChangeNotify( ) notifies the local ORA (via an RPC at step 204) that an object has an urgent change. Upon notification, the ORA promptly derives the urgent difference and propagates it as required. If the ORA service is not running, this function tags the object with a property time value at a field therein, as shown in field 94 in sample object 96 of FIG. 7. When the ORA service restarts, the timestamp is evaluated by the ORA service and if relatively recent, the urgent difference is derived and propagated as previously described.

At step 206, the replication facility 34 of the present invention evaluates the relative urgency of each object that has identified itself as being urgent, as determined according to policies set by the system administrator. For example, security-type changes may be considered urgent enough to propagate every three minutes, while group changes may be propagated every ten minutes. The differencing information is generated almost immediately after notification, but only a single difference is derived regardless of how many edges are present over which the difference will be replicated.

Thus, unlike incremental replication, at step 210 the ORA service, promptly, but synchronously, asks the object having an urgent change to generate its differencing information. Once the difference is obtained, a copy of it is delivered on each appropriate edge in the topology at step 212.

At step 214, the destination receives the differencing information and reconciles the objects as desired, preferably with relatively high priority. Communication between the source and destination takes place in the previously described manner over any suitable transport mechanism, however for security purposes synchronous replication is highly desirable. So that all replicas in the distributed system 20 receive the changes, the destination can be arranged to forward these urgent changes in a similarly urgent manner to other replicas that are not connected to the originating source.

As can be seen from the foregoing detailed description, there is provided a system and method for efficiently replicating data objects in a distributed system of replicas. The replication facility maintains incremental differencing information and replicates the differencing information upon a request for replication. The replication facility further enables the expedited replication of certain data objects deemed urgent, wherein a data structure may initiate its propagation to other replicas in the system. The replication facility replicates objects in an object-oriented environment, without the need for the replication objects to have knowledge of the replication topology or the operating environment. The replication facility is independent of the type of file systems used to store those objects, and is extensible.

The invention claimed is:

1. In a distributed computer system, a computer-implemented method of providing urgent replication of a source object in a source computer to a destination replica object in a destination replica in the system wherein the state of the source object has changed, the method comprising the steps of:
   identifying, by the source computer, a first difference in the changed source object;
   waiting, by the source computer, for the destination replica to initiate a first replication cycle for transmitting, from the source computer, changes to the source object to the destination replica;
   transmitting, by the source computer, the first difference to the destination replica;
   receiving, by the destination replica, the transmitted first difference;
   applying, by the destination replica, the transmitted first difference to the destination replica;
   identifying, by the source computer, a second difference in the changed source object, wherein the second difference is an update requiring urgent replication, wherein the update is at least one of a plurality of events triggering replication by the source computer, and wherein the plurality of events comprises a change to a password;
   transmitting, by the source computer, the second difference to the destination replica without waiting for the destination replica to initiate a second replication cycle;
   receiving, by the destination replica, the transmitted second difference; and
   applying, by the destination replica, the transmitted second difference to the destination replica object.

2. The method of claim 1, further comprising the step of applying the first and second differences to the destination replica object such that the destination replica object is consistent with the changed source object.

3. The method of claim 1, wherein the step of identifying a first difference includes invoking a method of a replication framework.

4. The method of claim 1, wherein the step of transmitting the first difference includes a duplication of the entire source object.

5. The method of claim 1, wherein the step of identifying the first difference comprises the source object generating differencing information.

6. The method of claim 1, wherein the step of identifying the second difference comprises the source object generating differencing information.

7. The method of claim 1, wherein the plurality of events triggering replication by the source computer further comprises a change to at least one access right.

8. The method of claim 1, wherein the identifying, by the source computer, a second difference in the changed source object comprises:
   recognizing, by the source computer, the change to the password; and reporting the change to the password to a replication facility.

9. The method of claim 8, wherein the source object reports the change to the password to the replication facility using a ReplUrgentChangeNotify function.

10. The method of claim 9, wherein calling the ReplUrgentChangeNotify function notifies a local object replicator agent than the source object has an urgent update.

11. The method of claim 10, further comprising:
deriving, by the local object replicator agent, the second difference; and
propagating, by the local object replicator agent, the second difference.

12. The method of claim 10, further comprising:
if the local object replicator agent is not running, tagging the source object with a property time value; and
when the local object replicator agent restarts, evaluating, by the local object replicator agent, a relative urgency of the update to the object using the property time value.

13. A computer-readable storage medium storing computer-executable instructions for providing urgent replication of a source object in a source computer to a destination replica object in a destination replica in a system wherein the state of the source object has changed, the method comprising the steps of:
identifying, by the source computer, a first difference in the changed source object;
waiting, by the source computer, for the destination replica to initiate a first replication cycle for transmitting, from the source computer, changes to the source object to the destination replica;
transmitting, by the source computer, the first difference to the destination replica;
receiving, by the destination replica, the transmitted first difference;
applying, by the destination replica, the transmitted first difference to the destination replica;
identifying, by the source computer, a second difference in the changed source object, wherein the second difference is an update requiring urgent replication, wherein the update is at least one of a plurality of events triggering replication by the source computer, and wherein the plurality of events comprises a change to a password;
transmitting, by the source computer, the second difference to the destination replica without waiting for the destination replica to initiate a second replication cycle;
receiving, by the destination replica, the transmitted second difference; and
applying, by the destination replica, the transmitted second difference to the destination replica object.

14. The computer-readable storage medium of claim 13, wherein the step of identifying the second difference comprises the source object generating differencing information.

15. The computer-readable storage medium of claim 13, wherein the plurality of events triggering replication by the source computer comprises a change to at least one access right.

16. The computer-readable storage medium of claim 13, wherein the identifying, by the source object, comprises:
recognizing, by the source object, the change to the password; and
reporting the change to the password to a replication facility.

17. The computer-readable storage medium of claim 16, wherein the source object reports the change to the password to the replication facility using a ReplUrgentChangeNotify function.

18. A system for providing urgent replication of a source object in a source computer to a destination replica object in a destination replica, wherein the state of the source object has changed, the system comprising:
at least one processor; and
memory coupled to the processor, the memory comprising computer program instructions executable by the at least one processor for:
identifying, by the source computer, a first difference in the changed source object;
waiting, by the source computer, for the destination replica to initiate a first replication cycle for transmitting, from the source computer, changes to the source object to the destination replica;
transmitting, by the source computer, the first difference to the destination replica;
receiving, by the destination replica, the transmitted first difference;
applying, by the destination replica, the transmitted first difference to the destination replica;
identifying, by the source computer, a second difference in the changed source object, wherein the second difference is an update requiring urgent replication, wherein the update is at least one of a plurality of events triggering replication by the source computer, and wherein the plurality of events comprises a change to a password;
transmitting, by the source computer, the second difference to the destination replica without waiting for the destination replica to initiate a second replication cycle;
receiving, by the destination replica, the transmitted second difference; and
applying, by the destination replica, the transmitted second difference to the destination replica object.

19. The system of claim 18, wherein the plurality of events triggering replication by the source computer comprises a change to at least one access right.

20. The system of claim 18, wherein the identifying, by the source computer, a second difference in the changed source object comprises:
recognizing, by the source object, the change to the password; and
reporting the change to the password to a replication facility.

* * * * *